3,252,789
METHOD AND APPARATUS FOR DISPOSING OF CHIPS FROM CUTTING MACHINE TOOLS
Hans Lindemann, Bielefeld, Germany, assignor to Th. Calow & Co., Bielefeld, Germany
Filed Sept. 28, 1961, Ser. No. 143,010
Claims priority, application Germany, Oct. 14, 1960, C 22,528
7 Claims. (Cl. 75—43)

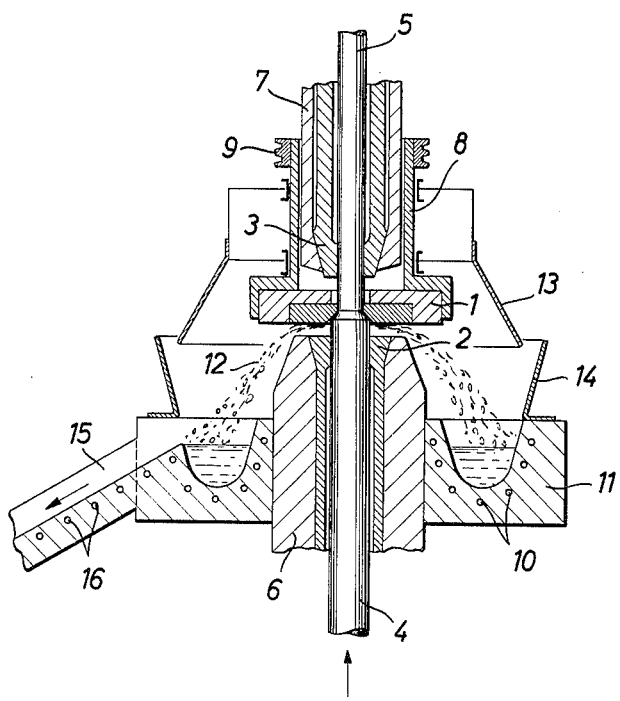

The present invention relates to a method of disposing of chips from cutting machine tools and to an apparatus for executing this method.

Prior to this invention it has been conventional in cutting machine tools, especially when machining workpieces of steel or other metals, to provide suitable devices such as chip breakers for insuring that the chips such as turnings, borings, drillings, or the like will only have a relatively short length. Depending upon the particular type of the respective machine tool, the chips either leave the machine freely or, as it is known in scalping machines, they are passed through channels in the revolving cutter head of such a machine and thus to the periphery thereof where they are broken up. The turnings which are produced when machining workpieces on a lathe are also sometimes passed through a funnel to an accessory on the lathe in which they are broken up to a relatively small size similar to the size of the chips which are broken up by the chip breakers of scalping machines. These broken chips then take up a relatively small space and may be more easily handled and transported than the unbroken kind.

It is also conventional to bale chips of any kind, either broken or unbroken, by a baling or packing press which may be either connected to the respective machine tool or form a separate unit. Such presses operate with considerable pressures which, if the press is connected to the machine tool, require the latter to be built of great strength. Such presses—whether they are separate or form parts of the machine tools—are also very expensive and require considerable space.

It is the object of the present invention to overcome all of the disadvantages of the different conventional manners of disposing of chips from machine tools by melting the chips immediately after they are produced, and it is a further object of the invention to provide a melting apparatus which forms an accessory of the machine tool and may even form a structural part thereof.

The present invention is based upon the concept that, inasmuch as the chips which are produced on a machine tool usually have at first a considerable temperature, this temperature may be utilized for reducing the amount of energy which is necessary for melting the chips. Also, by melting the chips immediately after they are formed and while they still have a considerable temperature, the melting apparatus may be made of a relatively small size. The present invention therefore permits a much more simple and economical disposal of chips of any meltable material than any other method heretofore known.

The melting operation may be carried out in many different manners and by different means. Thus, for example, the channels through which the chips are conducted after being formed may be heated to the melting temperature of the chips. These channels may be either provided on a revolving cutter head, for example, of a scalping machine, or they may be stationary channels for conducting the chips to a collecting container. It is, however, also possible to design this container in the form of a melting furnace.

One preferred embodiment of the invention is illustrated in the accompanying drawing which shows the invention applied, for example, to a vertical scalping machine in which the chips which are produced during the scalping of a metal rod are melted closely adjacent to the area where they are cut from the workpiece.

In the drawing, a wire, rod, or the like which is to be machined by a revolving cutter head 1 while being prevented by suitable means from turning about its axis is fed upwardly through suitable guiding means 2 and 3 which are disposed immediately in front of and behind the cutter head, whereby the diameter of the workpiece 4 is reduced by being scalped to the desired diameter of the part 5. The colletlike members 2 and 3 are provided with conical ends which engage with corresponding conical inner surfaces of tubular supporting members 6 and 7, and each colletlike member 2 and 3 is acted upon by at least one spring or the like not shown. The cutter head 1 is secured to a tubular shaft 8 but is preferably removable therefrom, and this tubular shaft 8 may be driven, for example, by a pulley 9 or any other suitable means.

In the particular embodiment of the invention as illustrated in the drawing, the tubular supporting member 6 carries an annular trough 11 which is adapted to receive the chips 12 which are prevented from escaping laterally by outer shields 13 and 14 or other suitable guiding means. This trough 11 may be heated in any suitable manner but preferably electrically, for example, by heating wires 10 so as to melt the chips 12 as soon as they fall into the trough. The melted material is then conducted through a channel 15, which may likewise be heated, for example, by heating wires 16, to a place, for example, a melting furnace, where it may be cast, for example, into bars or ingots.

The particular design and construction of the melting apparatus according to the invention depends primarily upon the type of machine tool with which it is to be associated. Thus, the single embodiment of the invention as shown in the drawing is to be considered merely as an illustration of one of the numerous manners in which the invention may be executed and applied. Insofar as the invention is concerned, it is also immaterial whether the chips to be treated consist of metal or any other meltable material, and it is essential only that they are to be collected and melted at a point closely adjacent to the place where they are cut from the workpiece and that they are to be conducted away while in a liquid condition.

Having thus fully disclosed my invention, what I claim is:

1. A method of disposing of chips or the like from a cutting machine tool during the operation thereof comprising the steps of collecting the chips in their heated state caused by said operation at a place closely adjacent to their point of production on the machine tool, and melting said heated chips at said place.

2. A method of disposing of chips or the like from a cutting machine tool during the operation thereof comprising the steps of interrupting the fall of and collecting said chips as heated by said operation at a place closely adjacent to their point of production on the machine tool, melting said heated chips at said place, and conducting the melted material in a liquid condition away from said place.

3. A method of disposing of chips or the like from a cutting machine tool during the operation thereof comprising the steps of guiding the chips as soon as cut on said machine tool during the fall of said chips therefrom to a place closely adjacent to their point of production, melting said chips progressively at said place and conducting the melted material in a liquid condition away from said place and from said machine tool.

4. An apparatus to be used as an accessory for a cutting machine tool for the disposal of chips comprising a melting vessel adapted to be mounted at a place closely adjacent to the point of production of said chips and in a position below said point of production so as to interrupt the fall of and to receive said chips immediately after being produced on said machine tool, and means for heating said vessel to melt said chips.

5. An apparatus to be used as an accessory for a cutting machine tool for the disposal of chips comprising an open-topped melting vessel adapted to be mounted on said machine tool at a place closely adjacent to the point of production of said chips and in a position below said point of production so as to interrupt the fall of and to receive said chips from said machine tool immediately after being produced thereby, means for heating said vessel to melt said chips, and means for discharging the melted material in a liquid condition from said vessel.

6. An apparatus to be used as an accessory for a cutting machine tool for the disposal of chips comprising a melting vessel adapted to be mounted on said machine tool in a position in which said melting vessel is coaxial with said machine tool at a place closely adjacent to the point of production of said chips, means for guiding said chips from said point of production into said vessel, means for heating said vessel to melt said chips, channel means connected to said vessel for conducting the melted material from said vessel, and means for heating said channel means to maintain the material in a liquid condition.

7. An apparatus to be used as an accessory for a cutting machine tool for the disposal of chips comprising a melting vessel comprising an annular trough surrounding and supported by said machine tool at a place closely adjacent to the point of production of said chips, means for guiding said chips from said point of production into said vessel, electric heating means for heating said vessel to melt said chips, channel means connected to said vessel for conducting the melted material from said vessel, and electric heating means for heating said channel means to maintain the material in a liquid condition while passing through said channel means.

References Cited by the Examiner
UNITED STATES PATENTS

| | | | |
|---|---|---|---|
| 2,446,637 | 8/1948 | Crampton et al. | 75—65 |
| 2,568,578 | 9/1951 | Bennett | 266—38 XR |
| 2,959,757 | 11/1960 | Toma. | |

JOHN F. CAMPBELL, *Primary Examiner.*

MARCUS U. LYONS, *Examiner.*